United States Patent
Kao et al.

(10) Patent No.: US 9,148,689 B2
(45) Date of Patent: Sep. 29, 2015

(54) OPTICAL REMOTE CONTROL SYSTEM

(75) Inventors: Ming-Tsan Kao, Hsin-Chu (TW);
Chao-Chien Huang, Hsin-Chu (TW);
Chia-Cheun Liang, Hsin-Chu (TW);
Yi-Hsien Ko, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 699 days.

(21) Appl. No.: 13/444,814

(22) Filed: Apr. 11, 2012

(65) Prior Publication Data

US 2013/0021237 A1 Jan. 24, 2013

(30) Foreign Application Priority Data

Jul. 19, 2011 (TW) .............................. 100125434 A (51) Int. Cl.
*G05B 11/01* (2006.01)
*H04N 21/422* (2011.01)
*G06F 3/03* (2006.01)

(52) U.S. Cl.
CPC ........ *H04N 21/42222* (2013.01); *G06F 3/0325* (2013.01); *H04N 21/42221* (2013.01)

(58) Field of Classification Search
None
See application file for complete search history.

(56) References Cited

U.S. PATENT DOCUMENTS

| | | | | |
|---|---|---|---|---|
| 5,883,680 A | * | 3/1999 | Nykerk | 348/734 |
| 7,690,994 B2 | * | 4/2010 | Dohta | 463/37 |
| 8,441,440 B2 | * | 5/2013 | Makita | 345/157 |
| 2002/0109794 A1 | * | 8/2002 | Bergman | 348/841 |
| 2004/0176022 A1 | * | 9/2004 | Thrasher et al. | 454/256 |
| 2007/0230723 A1 | * | 10/2007 | Hobson et al. | 381/300 |
| 2008/0180396 A1 | | 7/2008 | Lin | |
| 2008/0284724 A1 | * | 11/2008 | Alten | 345/156 |
| 2010/0163633 A1 | * | 7/2010 | Barrett et al. | 236/49.3 |

FOREIGN PATENT DOCUMENTS

| | | |
|---|---|---|
| CA | 2614920 A1 | 7/2009 |
| CN | 2624332 Y | 7/2004 |
| CN | 101246642 A | 8/2008 |
| CN | 101542550 A | 9/2009 |
| CN | 201845962 U | 5/2011 |
| JP | 2004517406 A | 6/2004 |
| WO | 2009026688 A1 | 3/2009 |

* cited by examiner

*Primary Examiner* — Firmin Backer
*Assistant Examiner* — Brian Wilson
(74) *Attorney, Agent, or Firm* — Winston Hsu; Scott Margo (57) ABSTRACT

An optical remote control system includes a home appliance and a remote controller. The home appliance operates according to a user command and its housing includes an opening. A status indicator light and a reference light are disposed within the opening. The status indicator light includes a visible light source, and the reference light includes a plurality of infrared light sources. The visible light source and the infrared light sources are disposed in a predetermined pattern. The remote controller includes an optical sensor configured to detect optical signals from the infrared light sources, thereby generating the user command accordingly.

16 Claims, 9 Drawing Sheets

OPTICAL REMOTE CONTROL SYSTEM

BACKGROUND OF THE INVENTION

1. Field of the Invention

The present invention is related to an optical remote system, and more particularly, to an optical remote system which disposes a reference light source in an existing opening of a home appliance.

2. Description of the Prior Art

Common home appliances include televisions, telephones, refrigerators, air-conditioning, game consoles, and disc players. A specific remote controller is required for controller each type of home appliance, which may cause inconvenience to users.

With rapid development of technology, interactive intelligent home has become the mainstream. The OSGi Alliance is an independent non-profit corporation comprised of technology innovators and developers (such as IBM, Sun, BMW, Motorola, Nortel, Nokia, Philips, Panasonic, Sony, Toshiba, and Echelon) and focused on the interoperability of applications and services based on its component integration Java platform. The main purpose is to provide a service-oriented, component-based environment for developers and offers standardized ways to manage various types of equipment, such as home appliances.

Optical positioning is often required for detecting position change between a user and a home appliance in order to provide interactive applications in intelligence home. Multiple infrared light sources are required for reducing interference of visible light and increasing the accuracy of optical positioning. The disposition of extra infrared light sources may increase manufacturing cost and influence aesthetic.

SUMMARY OF THE INVENTION

The present invention provides an optical remote control system including a home appliance and a remote controller. The home appliance is configured to operate according to a user command and includes a housing including a first opening; a status indicator light disposed in the first opening and including a first light source; and a first reference light disposed in the first opening and including a second light source. The remote controller includes an optical sensor configured to detect optical signals from the second light source for issuing the user command.

The present invention provides an optical remote control system including a display device configured to operate according to a user command; an acoustic device including a sound hole and configured to broadcast sound when the display device is operating; a reference light disposed in the sound hole and including a light source; and a remote controller including an optical sensor configured to detect optical signals from the light source for issuing the user command.

The present invention provides an optical remote control system including a home appliance and a remote controller. The home appliance is configured to operate according to a user command and includes a housing including an opening; a heat-dissipating device configured to conduct a heat generated by the home appliance out of the housing via the opening; a reference light disposed in the opening and including a light source. The remote controller includes an optical sensor configured to detect optical signals from the light source for issuing the user command.

These and other objectives of the present invention will no doubt become obvious to those of ordinary skill in the art after reading the following detailed description of the preferred embodiment that is illustrated in the various figures and drawings.

DETAILED DESCRIPTION

Home appliances normally include various openings for disposing status indicator lights, or serving as sound openings of an acoustic devices or vents of a heat-dissipating device. In the present invention, a reference light may be disposed in an existing opening of a home appliance. Optical positioning may then be performed by detecting optical signals of the reference light using a remote controller.

Figure 1:
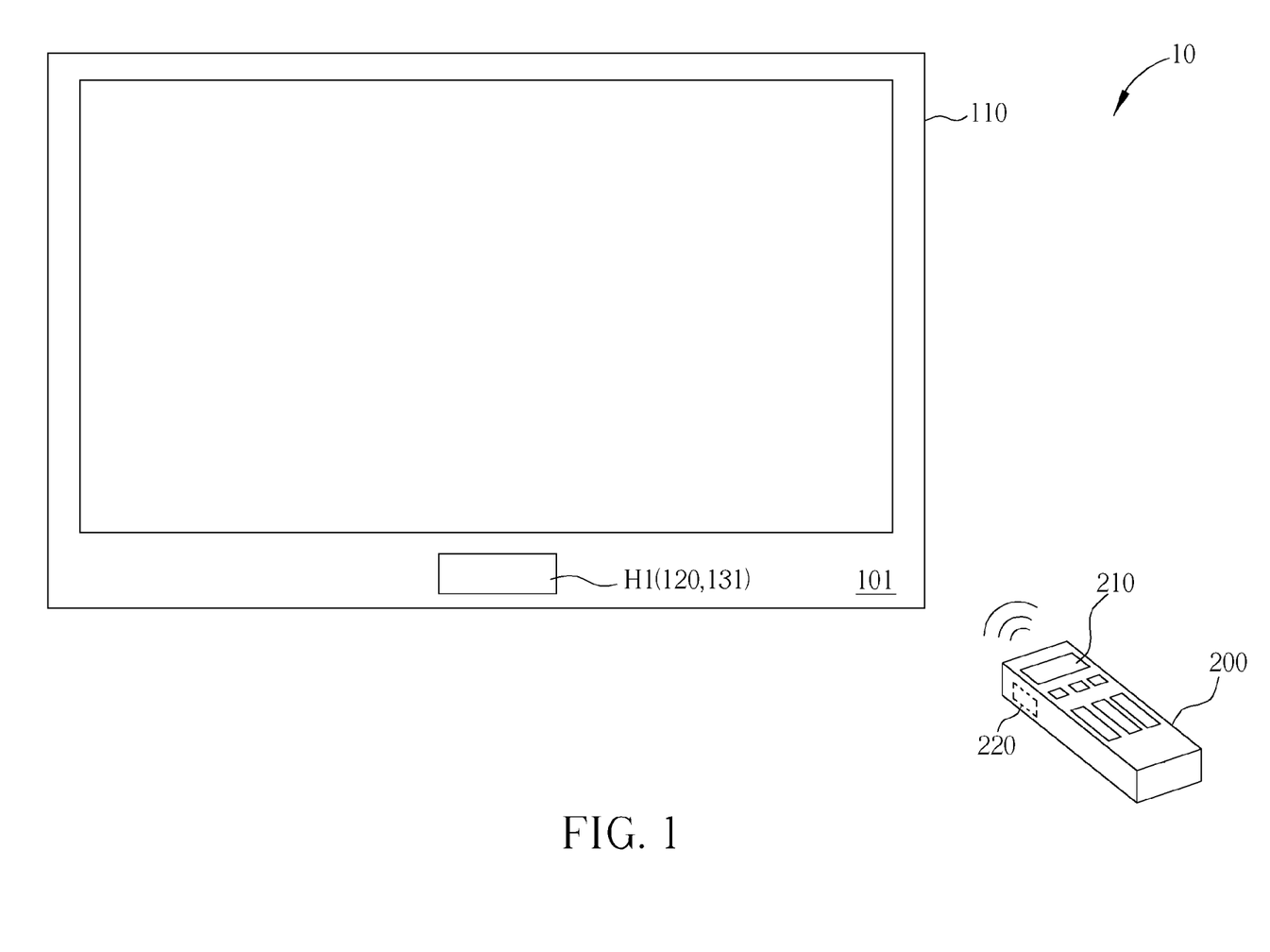
FIG. 1 is a diagram illustrating an optical remote system according to an embodiment of the present invention.

FIG. 1 is a diagram illustrating an optical remote system 10 according to a first embodiment of the present invention. The optical remote system 10 includes a home appliance 101 and a remote controller 200. FIG. 1 depicts the front-side of the home appliance 101 which includes a housing 110, a status indicator light 120 and a reference light 131. The status indicator light 120 and the reference light 131 are disposed in an opening H1 of the housing 110 and arranged in a specific pattern, which will be described in more detail. The remote controller 200 includes an optical sensor 210 and a judging device 220. The optical sensor 210 is configured to detect the optical signals from the reference light 131, thereby generating a corresponding optical pattern. The judging device 220 is configured to perform optical positioning according to the optical pattern for determining the location of the remote controller 200 when issuing a user command.

Figure 2:
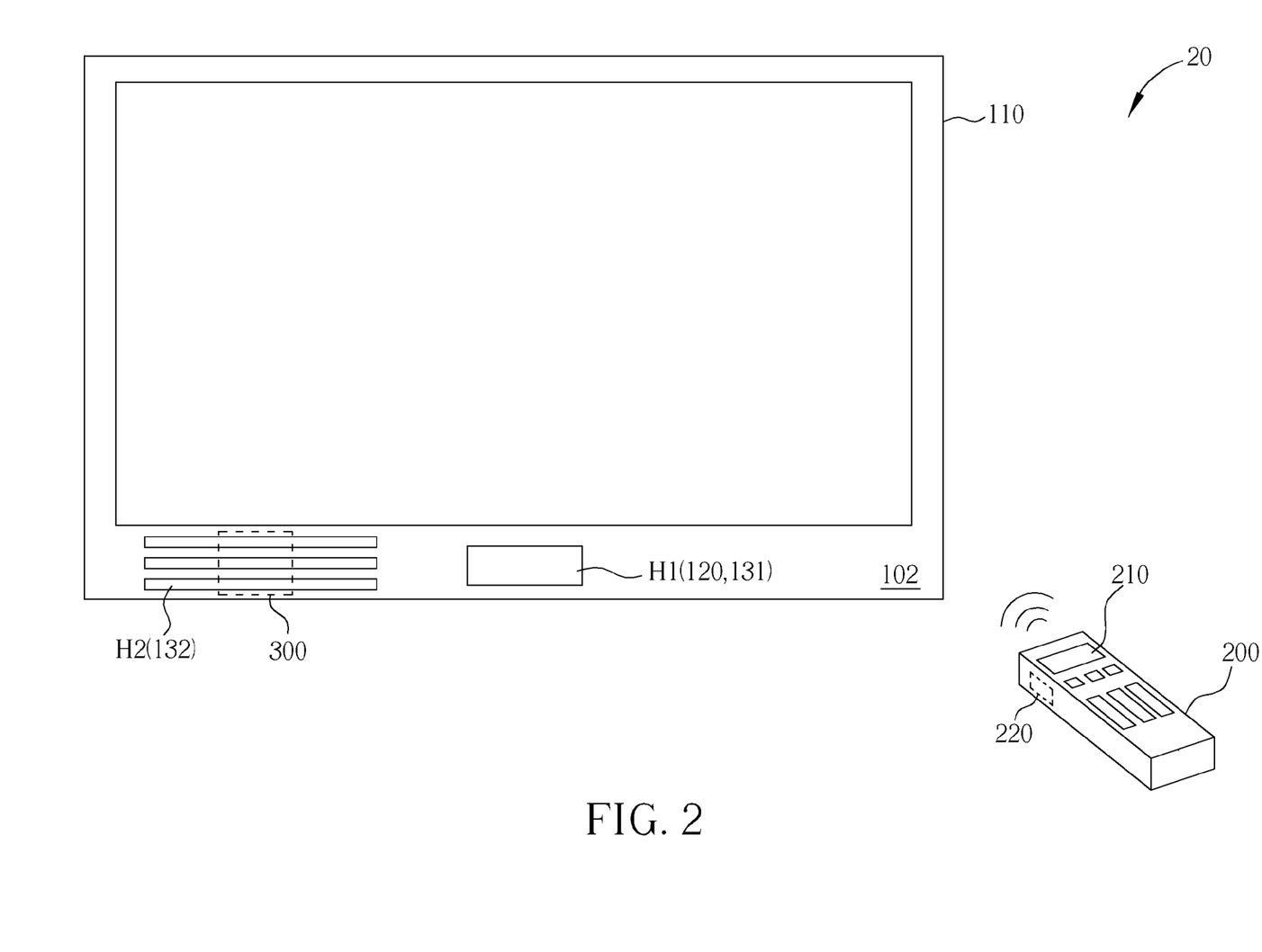
FIG. 2 is a diagram illustrating an optical remote system according to another embodiment of the present invention.

FIG. 2 is a diagram illustrating an optical remote system 20 according to a second embodiment of the present invention. The optical remote system 20 includes a home appliance 102 and a remote controller 200. FIG. 2 depicts the front-side of the home appliance 102 which includes a housing 110, a status indicator light 120, two reference lights 131 and 132, and a heat dissipation device 300. In the second embodiment of the present invention, the housing 110 includes an opening H1 and an opening H2. The status indicator light 120 and the reference light 131 are disposed in the opening H1 and arranged in a specific pattern. The heat dissipation device 300 may be a fan for conducting the heat generated by the home appliance 102 out of the housing 110 via the opening H2. The reference light 132 is disposed in the opening H2 and arranged in a specific pattern. The arrangement of the status indicator light 120 and the reference lights 131, 132 will be described in more detail. The remote controller 200 includes an optical sensor 210 and a judging device 220. The optical sensor 210 is configured to detect the optical signals from the reference light sources 131 and 132, thereby generating a corresponding optical pattern. The judging device 220 is configured to perform accurate optical positioning according to the optical pattern for determining the location and the angle of the remote controller 200 when issuing a user command.

Figure 3:
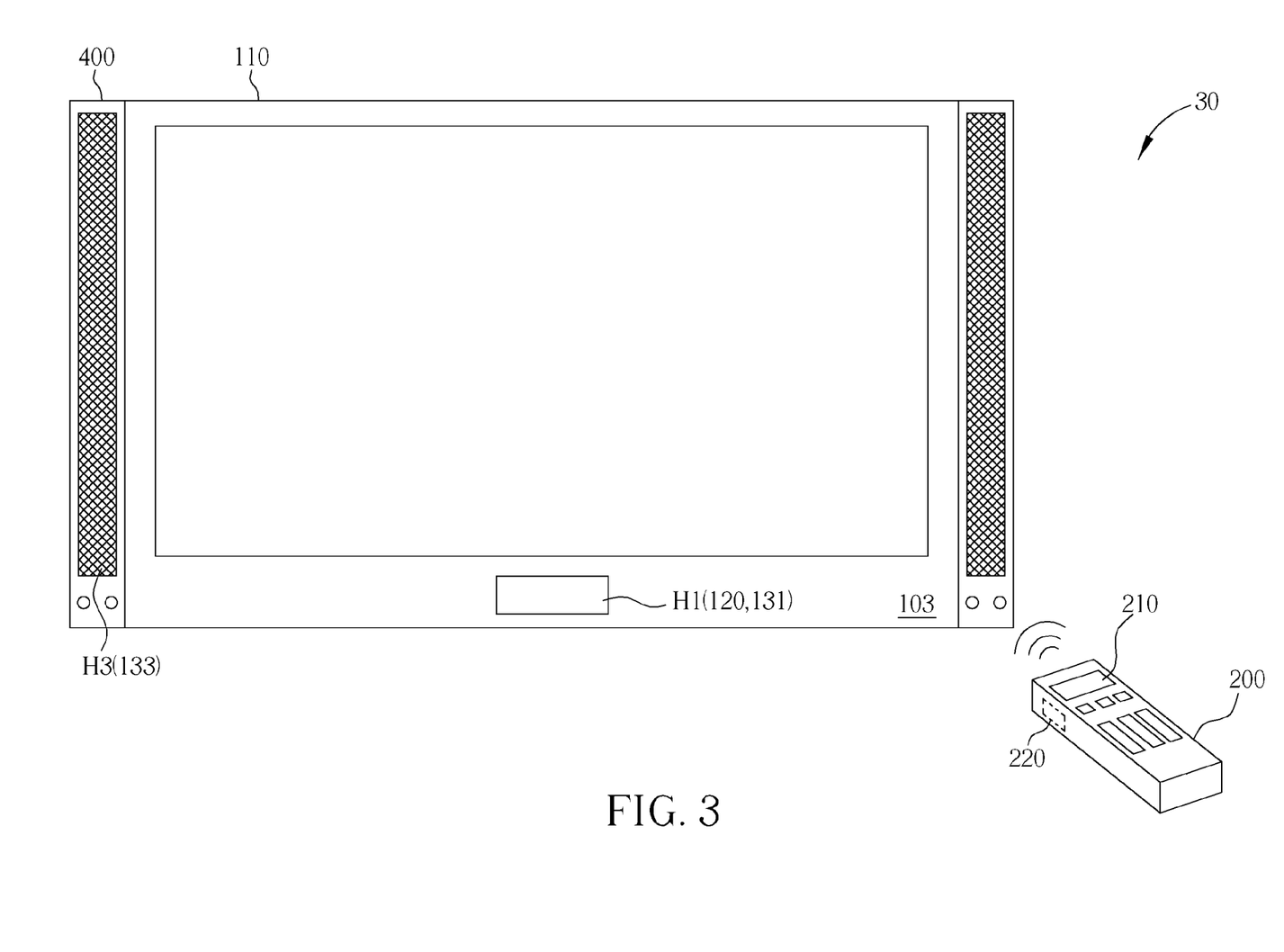
FIG. 3 is a diagram illustrating an optical remote system according to another embodiment of the present invention.

FIG. 3 is a diagram illustrating an optical remote system 30 according to a third embodiment of the present invention. The optical remote system 30 includes a home appliance 103 and a remote controller 200. FIG. 3 depicts the front-side of the home appliance 103 which may be a display device including a housing 110, a status indicator light 120, two reference lights 131 and 132, and an acoustic device 400. In the third embodiment of the present invention, the housing 110 includes an opening H1 and an opening H3. The status indicator light 120 and the reference light 131 are disposed in the opening H1 and arranged in a specific pattern. The acoustic device 400 is disposed in the housing 110 of the home appliance 103 for broadcasting sound via the opening H3 when the home appliance 103 is operating. The reference light 133 is disposed in housing 110 at a location corresponding to the opening H3 and arranged in a specific pattern. The arrangement of the status indicator light 120 and the reference lights 131, 133 will be described in more detail. The remote controller 200 includes an optical sensor 210 and a judging device 220. The optical sensor 210 is configured to detect the optical signals from the reference light sources 131 and 133, thereby generating a corresponding optical pattern. The judging device 220 is configured to perform accurate optical positioning according to the optical pattern for determining the location and angle of the remote controller 200 when issuing a user command.

Figure 4:
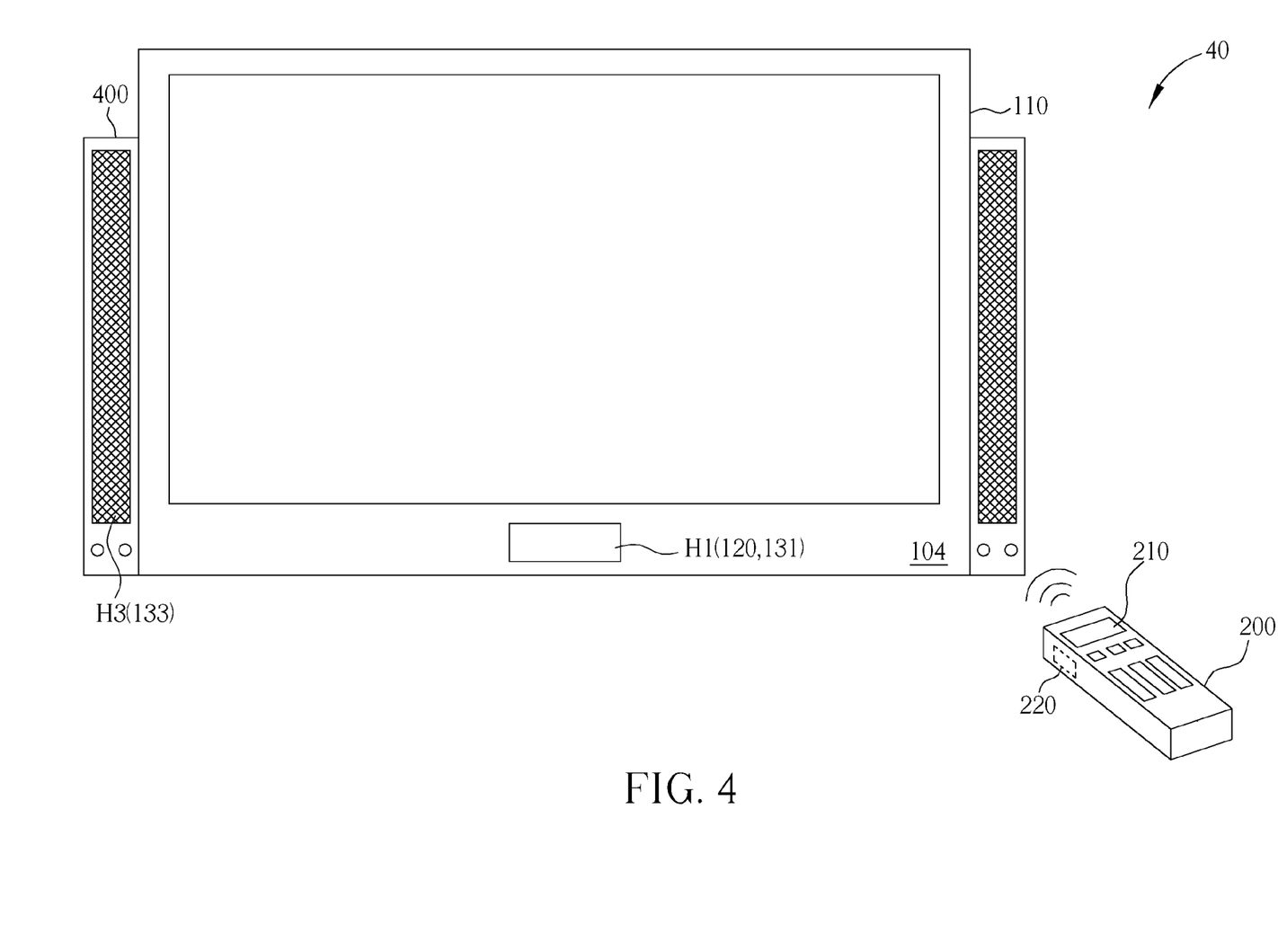
FIG. 4 is a diagram illustrating an optical remote system according to another embodiment of the present invention.

FIG. 4 is a diagram illustrating an optical remote system 40 according to a fourth embodiment of the present invention. The optical remote system 40 includes a home appliance 104 and a remote controller 200. FIG. 4 depicts the front-side of the home appliance 104 which may be a display device including a housing 110, a status indicator light 120, and a reference light 131. In the fourth embodiment of the present invention, acoustic devices 400 may be disposed on two sides of the home appliance 104. The sound boxes of the acoustic devices 400 may include a plurality of openings H3, via which the loudspeakers inside the sound boxes may broadcast sound when the home appliance 104 is operating. Meanwhile, reference lights 133 may be disposed in the acoustic devices 400 at locations corresponding to the openings H3. The arrangement of the status indicator light 120 and the reference lights 131-133 will be described in more detail. The remote controller 200 includes an optical sensor 210 and a judging device 220. The optical sensor 210 is configured to detect the optical signals from the reference lights 131 and 133, thereby generating a corresponding optical pattern. The judging device 220 is configured to perform accurate optical positioning according to the optical pattern for determining the location and angle of the remote controller 200 when issuing a user command.

In the embodiments of the present invention, the status indicator light 120 may include a visible light source which functions as a power status indicator light, a working status indicator light, or an illumination button of the home appliances 101~104. The reference lights 131~134 may include a plurality of infrared light sources disposed in corresponding openings and arranged in specific patterns. FIGS. 5~9 are diagrams illustrating the arrangement of the status indicator light 120 and the reference lights 131~134 (left side) and corresponding optical patterns detected by the remote controller 200 (right side).

In the embodiments illustrated in FIGS. 5~9, the status indicator light 120 includes a visible light source VL, while each of the reference lights 131-133 includes a plurality of infrared light sources IR1~IR3. The infrared light source IR1 is disposed in the opening H1 and arranged in a specific pattern. The infrared light source IR2 is disposed in the opening H2 and arranged in a specific pattern. The infrared light source IR3 is disposed in the opening H3 and arranged in a specific pattern.

Figure 5:
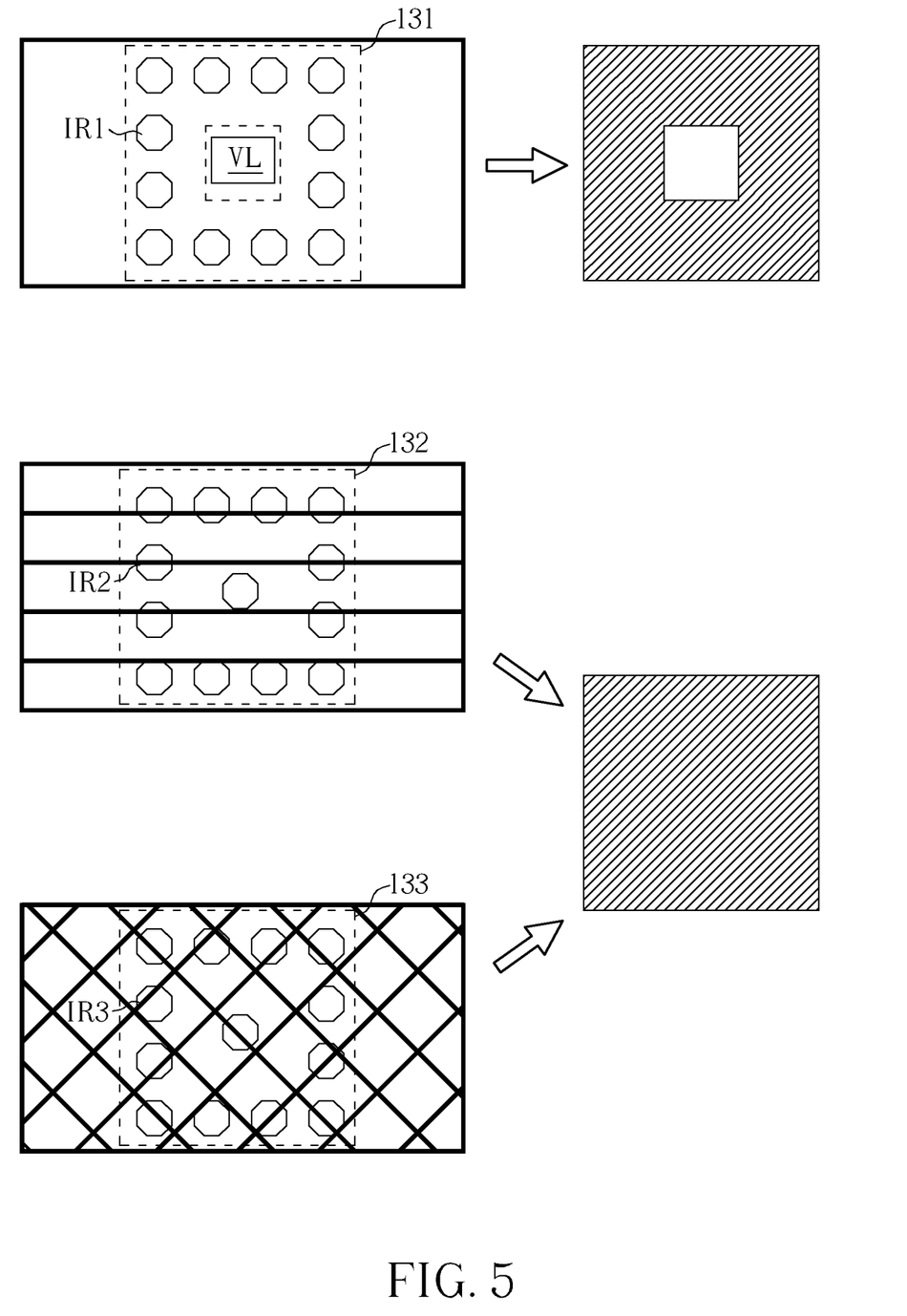
FIGS. 5~9 are diagrams illustrating the arrangement of a status indicator light and a reference light in an optical remote system of the present invention.

In the embodiment illustrated in FIG. 5, the infrared light sources IR1~IR3 may be arranged in specific patterns so that the optical sensor 210 may detect a symmetric optical pattern (such as a hollow/solid square). The remote controller 200 may then issue a corresponding user command.

Certain directional user commands, such as moving a cursor on a screen, may fail to be issued accurately if the remote controller 200 is positioned with a deviated angle.

Figure 6:
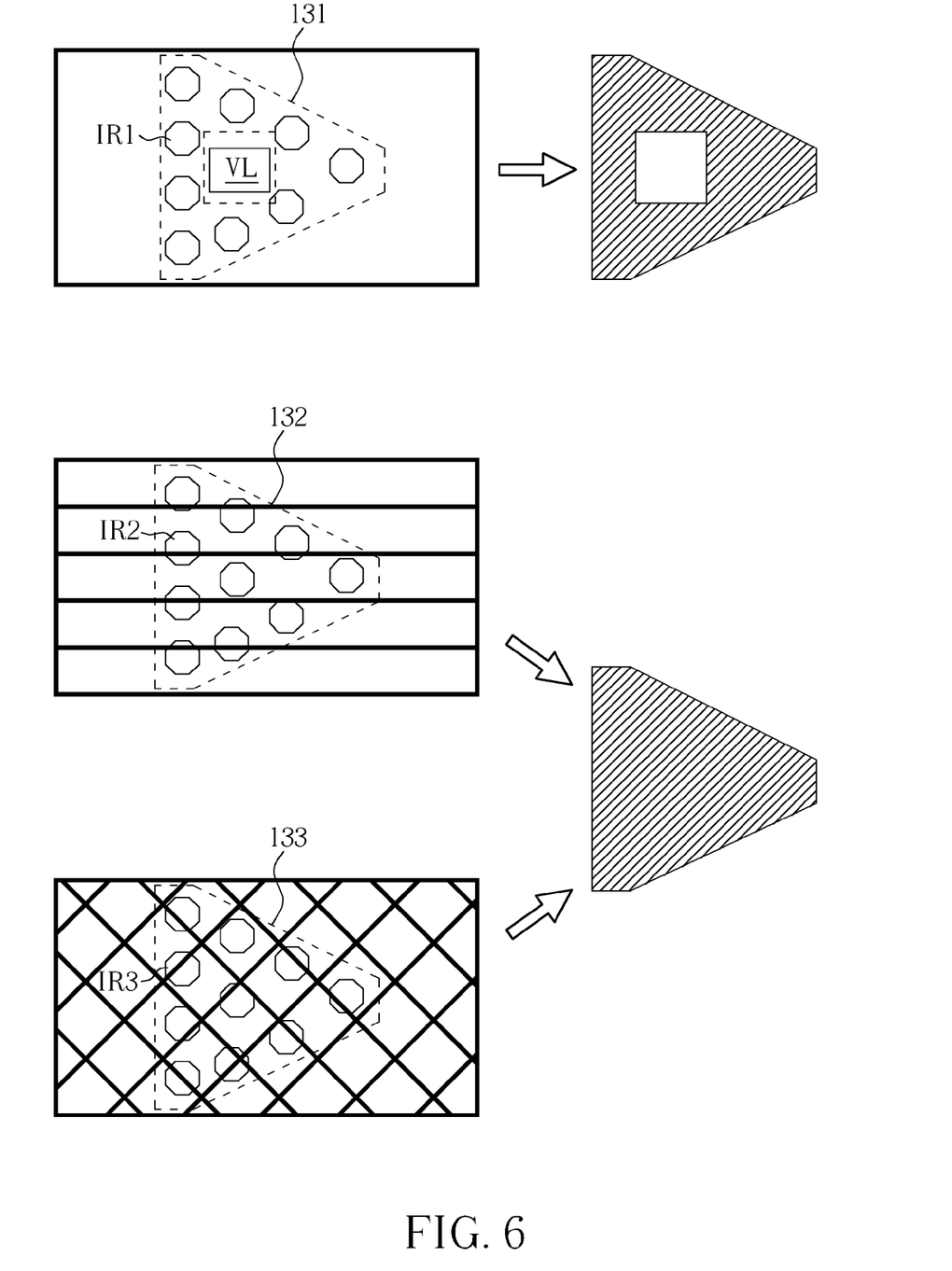

In the embodiment illustrated in FIG. 6, the infrared light sources IR1~IR3 may be arranged in specific patterns so that the optical sensor 210 may detect an optical pattern which is symmetric in a vertical direction and asymmetric in a horizontal direction (such as a hollow/solid right-pointing arrow). The remote controller 200 may then determine the relative angle between itself and the home appliances 101~104 according to the detected optical patter for issuing a corresponding user command accurately.

Figure 7:
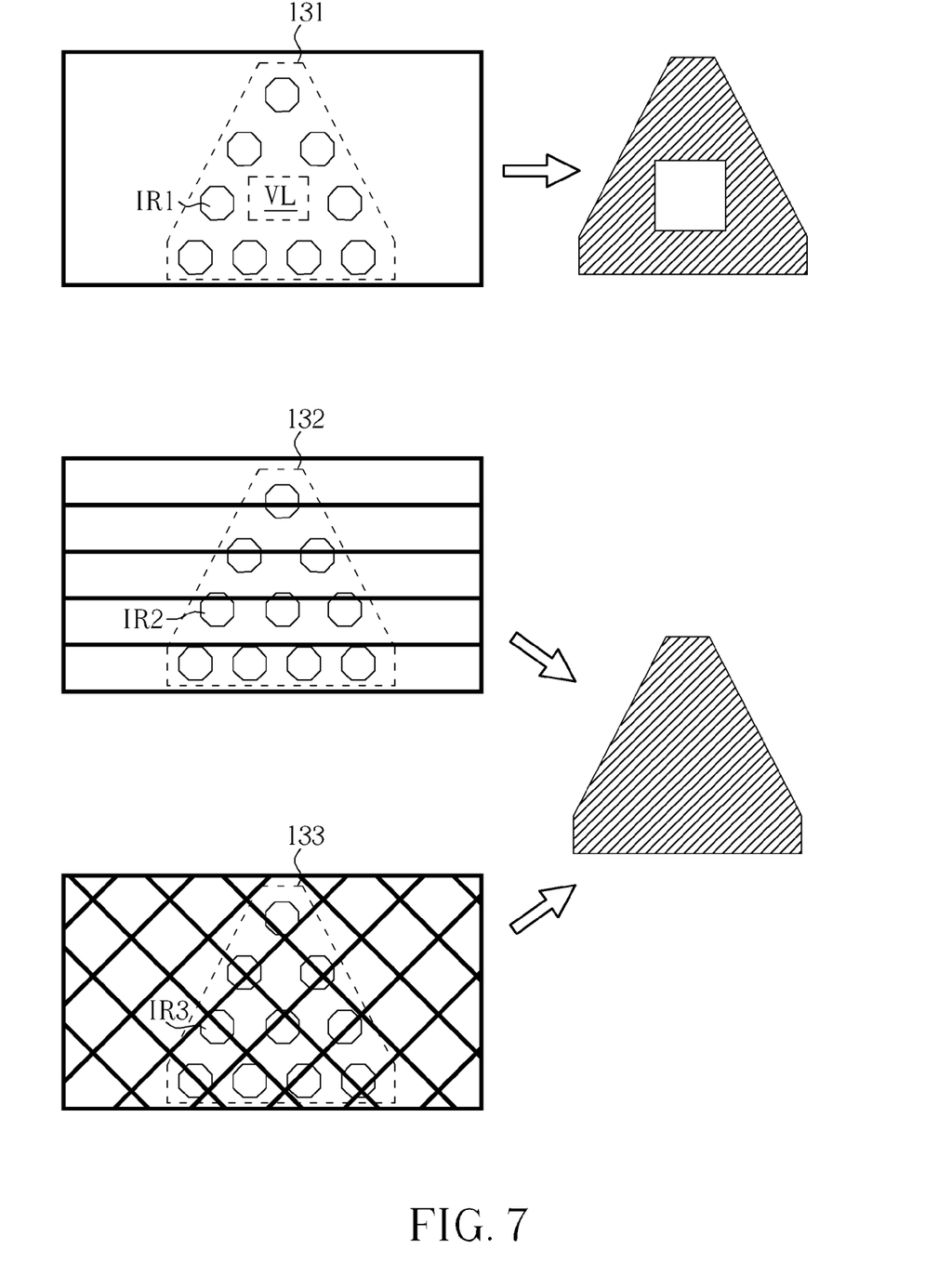

In the embodiment illustrated in FIG. 7, the infrared light sources IR1~IR3 may be arranged in specific patterns so that the optical sensor 210 may detect an optical pattern which is symmetric in a horizontal direction and asymmetric in a vertical direction (such as a hollow/solid up-pointing arrow). The remote controller 200 may then determine the relative angle between itself and the home appliances 101~104 according to the detected optical patter for issuing a corresponding user command accurately.

Figure 8:
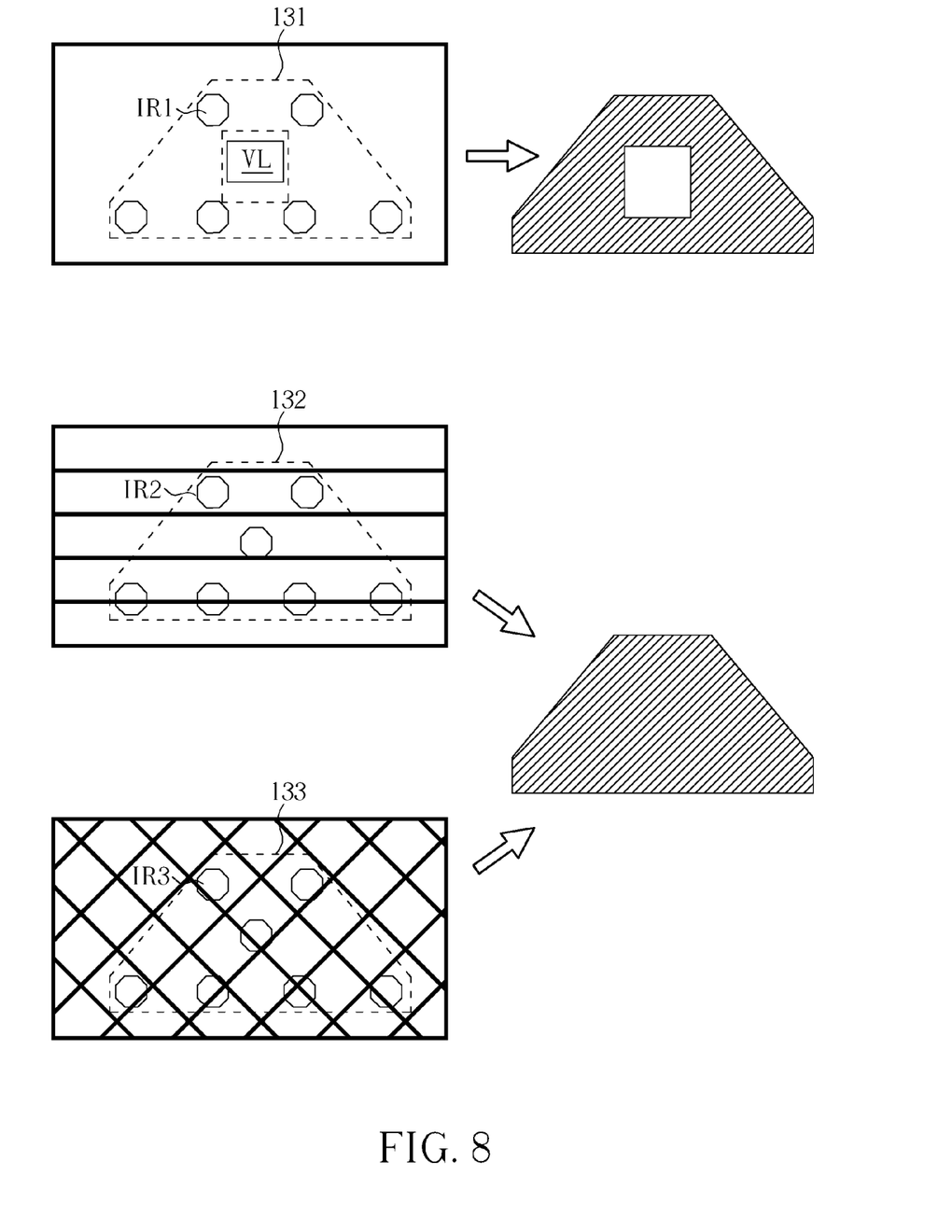
Figure 9:
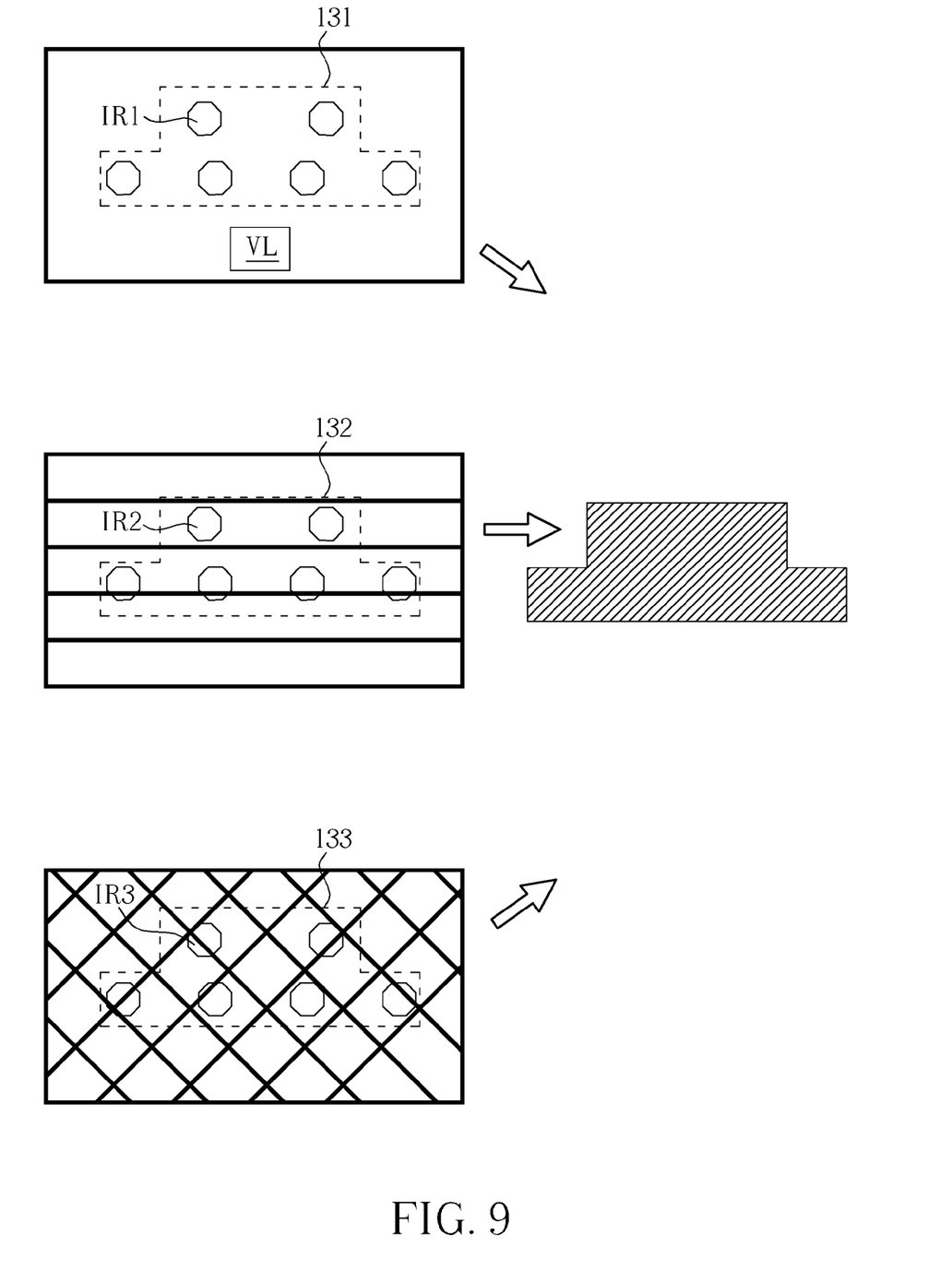

In the embodiment illustrated in FIG. 8 and FIG. 9, the infrared light sources IR1~IR3 may be arranged in specific patterns so that the optical sensor 210 may detect an optical pattern which points a specific direction (such as a hollow/solid trapezoid or similar). The remote controller 200 may then determine the relative angle between itself and the home appliances 101~104 according to the detected optical patter for issuing a corresponding user command accurately.

In the present invention, the visible light source VL and the infrared light sources IR1~IR3 may have identical or different shapes. At least one of the infrared light sources IR1~IR3 may be combined with the visible light source VL so as to provide one indicator light whose wavelength range covers the visible and the infrared wavelengths. The amount and arrangement of the infrared light sources IR1~IR3 may be determined so that the optical sensor 210 may detect an optical pattern which is symmetric or points a specific direction. The opening H1 may be exposed, or covered by a transparent protective layer. The openings H2 and H3 may adopt grid, stripe or other types of designs. The openings H1~H3 may be sound holes of an acoustic device, vents of a heat-dissipation device, or openings for other purposes. FIGS. 5~9 are merely for illustrative purposes and do not limit the scope of the present invention.

In the present invention, a reference light may be disposed in an existing opening of a home appliance, such as a hole for disposing a status indicator light, a sound hole of an acoustic device, or a vent of a heat-dissipation device. The reference light may include a plurality of infrared light sources disposed in a specific pattern so that the optical sensor 210 may detect corresponding optical patterns. Therefore, the present invention can provide accurate optical positioning without increasing manufacturing cost and influencing aesthetic.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical remote control system, comprising:
a home appliance configured to operate according to a user command and comprising:
a housing including:
a first opening; and
a second opening as a vent of a heat-dissipating device;
a status indicator light disposed in the first opening and including a first light source; and
a first reference light disposed in the first opening and including a second light source, wherein the first light source is a visible light source and the second light source is an infrared light source; and
a second reference light disposed within the housing at a location corresponding to the second opening and including a plurality of third light sources disposed in the second opening and arranged in a second pattern;
a remote controller including an optical sensor configured to:
detect optical signals from the second light source and the plurality of third light sources for issuing the user command; and
acquire a second optical pattern associated with the second pattern from the detected optical signals from the plurality of third light sources; and
a judging device configured to determine a location or an angle of the remote controller when issuing the user command according to the second optical pattern.

2. The optical remote control system of claim 1, wherein:
the first reference light further includes a plurality of second light sources disposed in the first opening and arranged in a first pattern; and
each of the plurality of the second light sources is an infrared light source.

3. The optical remote control system of claim 2, wherein:
the optical sensor is further configured to detect optical signals from the plurality of second light sources for acquiring a first optical pattern associated with the first pattern; and
the judging device is configured to determine the location or the angle of the remote controller when issuing the user command further according to the first optical pattern.

4. The optical remote control system of claim 3, wherein the judging device is configured to generate the user command according to a location and/or a shape of the first optical pattern.

5. The optical remote control system of claim 3, wherein the judging device is integrated within the remote controller.

6. The optical remote control system of claim 3, wherein the plurality of second light sources are arranged in the first pattern which is asymmetric in a horizontal direction, asymmetric in a vertical direction, or points a specific direction.

7. The optical remote control system of claim 1, wherein the status indicator light is a power status indicator light, a working status indicator light, or an illumination button of the home appliance.

8. The optical remote control system of claim 1, wherein:
the housing further includes a third opening as a sound hole of an acoustic device;
the optical remote control system further includes a third reference light disposed within the housing at a location corresponding to the third opening and including a fourth light source; and
the optical sensor is further configured to detect optical signals from the fourth light source for issuing the user command.

9. The optical remote control system of claim 8, wherein:
the third reference light includes a plurality of fourth light sources disposed in the third opening and arranged in a third pattern;
the optical sensor is further configured to detect optical signals from the plurality of fourth light sources for acquiring a third optical pattern associated with the third pattern; and
the judging device is configured to determine the location or the angle of the remote controller when issuing the user command further according to the third optical pattern.

10. The optical remote control system of claim 8 wherein the fourth light source is an infrared light source.

11. The optical remote control system of claim 1 wherein the plurality of third light sources are infrared light sources.

12. The optical remote control system of claim 1, further comprising:
an acoustic device disposed at a side of the home appliance and including a sound box with a third opening; and
a third reference light disposed in the third opening and including a fourth light source; wherein
the optical sensor is further configured to detect optical signals from the fourth light source for issuing the user command.

13. The optical remote control system of claim 12, wherein:
the third reference light includes a plurality of fourth light sources disposed in the third opening and arranged in a third pattern;
the optical sensor is further configured to detect optical signals from the plurality of fourth light sources for acquiring a third optical pattern associated with the third pattern; and
the judging device is configured to determine the location or the angle of the remote controller when issuing the user command further according to the third optical pattern.

14. The optical remote control system of claim 12 wherein fourth light source is an infrared light source.

15. An optical remote control system, comprising:
a home appliance configured to operate according to a user command and comprising:
a housing including an opening;
a heat-dissipating device configured to conduct a heat generated by the home appliance out of the housing via the opening;
a reference light disposed in the opening and including a plurality of light sources arranged in a specific pattern; and
a remote controller including an optical sensor configured to detect optical signals from the plurality of light sources for issuing the user command and for acquiring an optical pattern associated with the specific pattern; and
a judging device configured to determine an orientation of the remote controller when issuing the user command according to the optical pattern.

16. The optical remote control system of claim 15, wherein each of the plurality of light sources is an infrared light source.

* * * * *